(12) United States Patent
Bahei-Eldin et al.

(10) Patent No.: US 12,107,424 B2
(45) Date of Patent: Oct. 1, 2024

(54) CONTROL UNITS, SYSTEMS, AND METHODS FOR BOOSTING BATTERY CHARGING WITH NON-GRID POWER SOURCES

(71) Applicant: Rivian IP Holdings, LLC, Plymouth, MI (US)

(72) Inventors: Khaled Bahei-Eldin, Irvine, CA (US); Deidre Yiu, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 379 days.

(21) Appl. No.: 17/564,901

(22) Filed: Dec. 29, 2021

(65) Prior Publication Data

US 2023/0208142 A1    Jun. 29, 2023

(51) Int. Cl.
*H02J 3/32* (2006.01)
*H02J 7/00* (2006.01)

(52) U.S. Cl.
CPC ............ *H02J 3/32* (2013.01); *H02J 7/00712* (2020.01); *H02J 7/007188* (2020.01); *H02J 2203/10* (2020.01); *H02J 2207/20* (2020.01); *H02J 2300/24* (2020.01); *H02J 2300/28* (2020.01); *H02J 2300/40* (2020.01)

(58) Field of Classification Search
CPC .... H02J 3/32; H02J 7/00712; H02J 7/007188; H02J 2203/10; H02J 2207/20; H02J 2300/24; H02J 2300/28; H02J 2300/40; H02J 3/322; H02J 1/082; H02J 1/084; H02J 1/102; H02J 1/109; H02J 7/00036; H02J 7/02; H02J 9/00; H02J 2207/30; B60L 53/00; B60L 53/50; B60L 53/51; B60L 53/52; B60L 53/64
See application file for complete search history.

(56) References Cited

U.S. PATENT DOCUMENTS

2012/0249065 A1 * 10/2012 Bissonette ............ B60L 53/665 320/109
2021/0075252 A1 * 3/2021 Caamano ................ H02J 3/004
2021/0234396 A1 * 7/2021 Ghodke .................. H02M 1/10

* cited by examiner

*Primary Examiner* — Charles R Kasenge
(74) *Attorney, Agent, or Firm* — Patterson + Sheridan, LLP

(57) ABSTRACT

Various disclosed embodiments include illustrative controller units, systems, vehicles, and methods. In an illustrative embodiment, a control unit includes a communication device, a processor, and non-transitory computer-readable media configured to store computer-executable instructions. The instructions cause the processor to receive a signal indicating connection of a battery to a direct current bus, determine availability of electrical power from a first non-grid source, and instruct charging the battery with the electrical power from the first non-grid source responsive to determining that the electrical power from the first non-grid source is available.

17 Claims, 12 Drawing Sheets

CONTROL UNITS, SYSTEMS, AND METHODS FOR BOOSTING BATTERY CHARGING WITH NON-GRID POWER SOURCES

INTRODUCTION

The present disclosure relates to managing grid and non-grid power usage. The statements in this section merely provide background information related to the present disclosure and may not constitute prior art.

The cost of utility electrical power can be expensive, especially during ON-peak charging times. Thus, charging an electric vehicle during ON-peak charging times can be an expensive endeavor. Other non-grid direct current (DC) power sources can provide cheaper alternatives than utility electrical power.

BRIEF SUMMARY

Various disclosed embodiments include illustrative controller units, systems, vehicles, and methods.

In an illustrative embodiment, a control unit includes a communication device, a processor, and non-transitory computer-readable media configured to store computer-executable instructions. The instructions cause the processor to receive a signal indicating connection of a battery to a direct current (DC) bus, determine availability of electrical power from a first non-grid source, and instruct charging the battery with the electrical power from the first non-grid source responsive to determining that the electrical power from the first non-grid source is available.

In another illustrative embodiment, a system includes an alternating current (AC)-DC inverter, a DC bus couplable to the AC-DC inverter, and a control unit. The control unit includes a communication device, a processor, and non-transitory computer-readable media configured to store computer-executable instructions. The instructions cause the processor to receive a signal indicating connection of a battery to a direct current bus, determine availability of electrical power from a first non-grid source, and instruct charging the battery with the electrical power from the first non-grid source responsive to determining that the electrical power from the first non-grid source is available.

In another illustrative embodiment, a method includes connecting a battery to a direct current bus of a charging system, determining availability of electrical power from a first non-grid source, and charging the battery with the electrical power from the first non-grid source responsive to determining that the electrical power from the first non-grid source is available.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
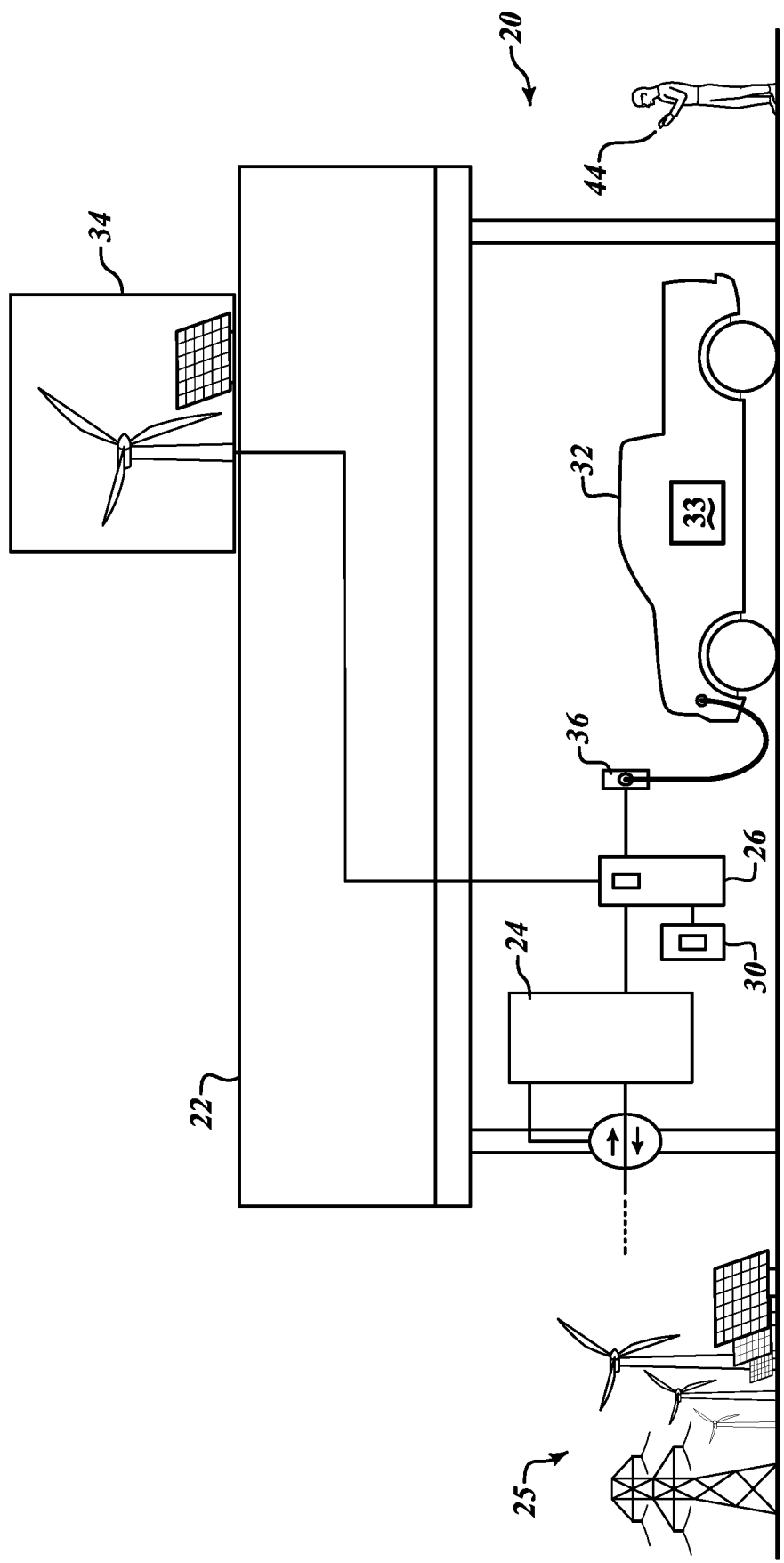
FIG. 1 is partial schematic diagram of an illustrative charging/discharging system in a structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative control units, systems, and methods. As will be explained below, such embodiments can control augmenting vehicle battery charging with various sources of electrical power.

Figure 2:
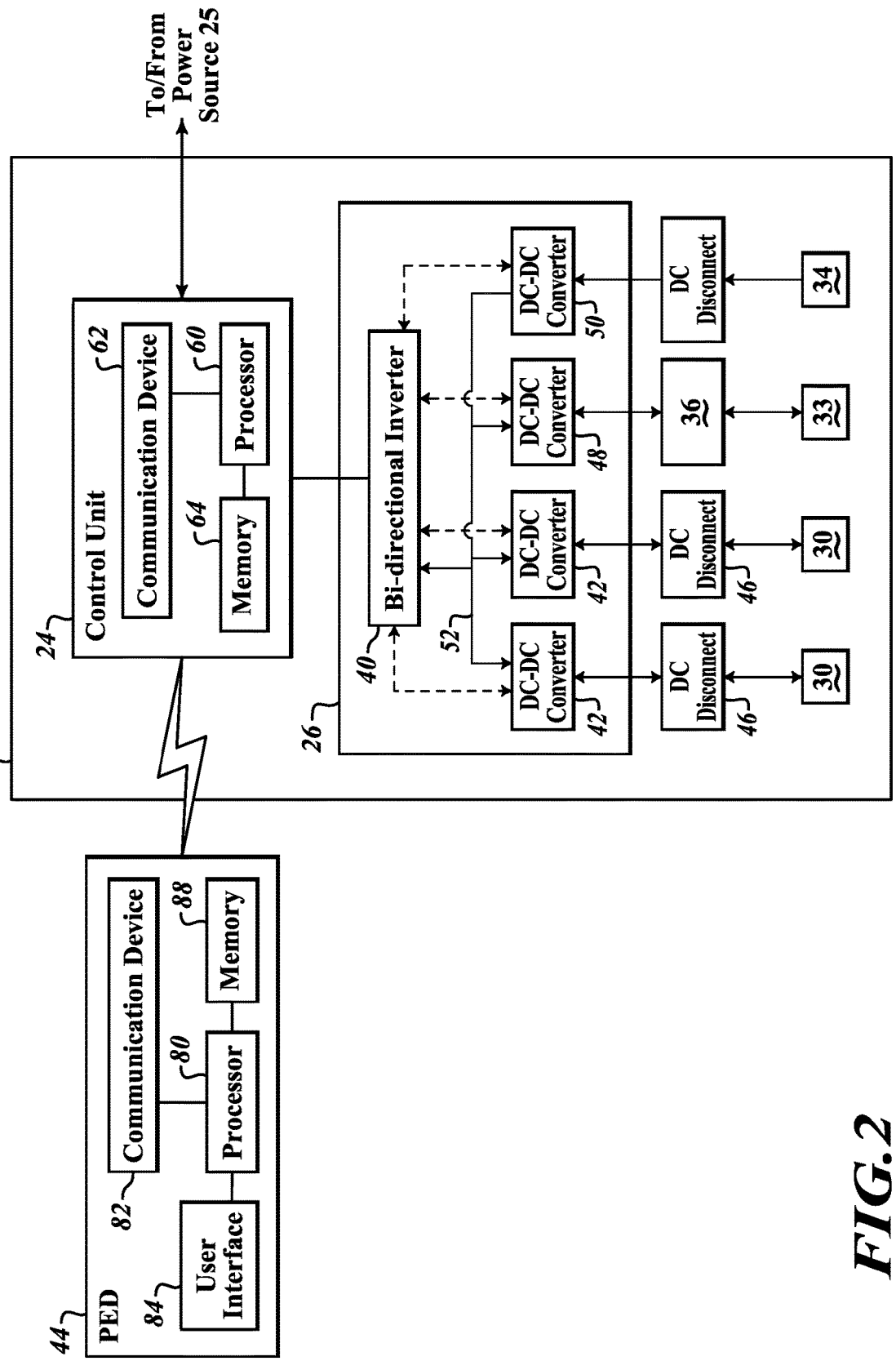
FIG. 2 is a block diagram in partial schematic form of illustrative components of the system of FIG. 1.

Given by way of non-limiting overview and referring to FIGS. 1 and 2, in various embodiments an illustrative system 20 is configured to perform battery charging with sources of electrical power other than from the grid and electrical power from the grid, if needed. In various embodiments the system 20 includes an alternating current (AC)-direct current (DC) inverter, such as a bidirectional inverter 40, a DC bus 52 couplable to the bidirectional inverter 40, and a control unit 24. The control unit 24 includes a communication device 62, a processor 60 configured to receive and send information via the communication device 62 and non-transitory computer-readable media, such as memory 64, configured to store computer-executable instructions. The instructions cause the processor 60 to receive a signal indicating connection of a battery 33 to the DC bus 52, determine availability of electrical power from a first non-grid source, such as an alternative energy source 34, and instruct charging the battery 33 with the electrical power from the alternative energy source 34 responsive to determining that the electrical power from the alternative energy source 34 is available.

Now that an overview has been presented by way of illustration only and not of limitation, details will be set forth by way of non-limiting examples given by way of illustration only and not of limitation. First, the illustrative system 20 will be explained by way of non-limiting examples given by way of illustration only. Then, illustrative processes for augmenting charging of a battery will be explained by way of non-limiting examples given by way of illustration only.

As shown in FIG. 1, in various embodiments the illustrative system 20 is configured to augment charging of the battery 33 of a vehicle 32 at a structure 22 with electrical power from electrical power sources other than a grid source, e.g., an alternating current (AC) grid energy source 25. In various embodiments the system 20 may include the control unit 24, a power electronics module (PEM) 26, a charging unit 36, a first non-grid source (the alternative energy source 34), and a second non-grid source (a backup battery 30). The structure 22 may be a residential structure, such as a house, a townhouse, a condominium, an apartment building, or the like, or a business structure such as an office building, a store, a factory, a warehouse, a hospital, or the like, or any other structure with an electrical system capable of connecting to the AC grid energy source 25 or other external energy supply/source.

In various embodiments the system 20 may also include a personal electronics device (PED) 44 provides operational information to a user regarding the battery 33 and the electrical power being used to augment charging of the battery 33, and grid power cost savings associated with the augmented charging. The PED 44 communicates with the control unit 24 and a charging unit 36 that connects the battery 33 of the vehicle 32 to the PEM 26. The PED 44 allows a user to view operation information related to augmenting electrical power for the battery 33. The PED 44 will be described in more detail below.

Given by way of non-limiting example, in various embodiments the vehicle 32 may be an electric vehicle (that is, an all-electrically driven vehicle) or a hybrid vehicle. For example and given by way of non-limiting examples, in various embodiments the vehicle may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 32 may include a marine vessel such as, without limitation, a boat, a ship, a submarine, a submersible, an autonomous underwater vehicle (AUV), and the like. Given by way of further non-limiting examples, in various embodiments the vehicle 32 may include an aircraft such as, without limitation, a fixed wing aircraft, a rotary wing aircraft, and a lighter-than-air (LTA) craft.

In various embodiments and given by way of example only and not of limitation, the battery 33 of the vehicle 32 or the backup battery 30 suitably includes high energy rechargeable batteries that store electrical charge, discharge electrical current upon request, and recharge. The battery or batteries may be structured in any desirable form, such as, without limitation, cylindrical, pouch, prismatic, massless, or other comparable forms. In various embodiments the battery or batteries include iron-air batteries, Li-ion batteries, such as, without limitation, Nickel Cobalt Aluminium, Lithium Manganese Cobalt, or Lithium Manganese Oxide batteries. However, other materials/devices may be used that provide comparable recharging, energy density, and energy discharge capabilities.

Those skilled in the art will appreciate that the AC grid energy source 25 may provide electrical power from a variety of different devices, such as wind turbine, solar cell, geothermal, nuclear power plants, hydro-electric power plants, natural gas power plants, coal-run power plants, or any mechanism that can produce AC electrical power. The supply of energy from the AC grid energy source 25 may be charged to customers at different rates depending upon time of day and/or customers' usage.

As shown in FIG. 2, in various embodiments the PEM 26 performs bidirectional conversion between AC electrical power to DC electrical power. The DC electrical power may be used for charging DC storage devices—the battery 33 and the backup battery 30. The PEM 26 includes an AC-DC bidirectional inverter 40 that is electrically coupled to the AC grid energy source 25 via a circuit breaker(s) included in the control unit 24. The backup battery 30, the battery 33, and the alternative energy source 34 are electrically coupled to the bidirectional inverter 40 via a DC bus 52 and respective DC-DC converters 42, 48, and 50. The non-grid electrical power sources may include the battery 30 or the alternative energy source 34, such as, without limitation, a wind turbine, a solar panel, generator, hydroelectric source, or the like.

In various embodiments the DC-DC converters 42, 48, and 50 are configured according to the device they are connected to. The AC-DC bidirectional inverter 40 converts AC electrical power received from the control unit 24 to DC electrical power and converts DC electrical power received from the backup battery 30, the battery 33 of the vehicle 32, and the alternative energy source 34 back to AC electrical power. First and second DC-DC converters 42 connect between the DC bus 52 and different backup batteries 30 via respective DC disconnect devices 46. A third DC-DC converter 48 connects between the DC bus 52 and the charging unit 36. A fourth DC-DC converter 50 connects between the DC bus 52 and the alternative energy source 34. Bidirectional inverters, DC-DC converters, and disconnect devices are extremely well known in the art and no further explanation is necessary for a person of skill in the art to understand disclosed subject matter.

In various embodiments the control unit 24 controls the augmentation of electrical power sent to the battery 33 of the vehicle 32. The control unit 24 includes the communication device 62, the processor 60 configured to receive and send information via the communication device 62 and non-transitory computer-readable media, such as the memory 64, configured to store computer-executable instructions and/or information associated with usage mode of how the backup battery 30 is to be used. The usage mode may be defined by a user, preset as a default, or set by an application program. The instructions cause the processor 60 to instruct the PEM 26 to augment the electrical power supplied to the battery 33 with power from the backup battery 30, the alternative energy source 34, and the AC grid energy source 25 according to analyses of various charging and grid scenarios.

In various embodiments the PED 44 may be a smartphone, tablet, smartwatch, or any device capable of providing information to a user. In various embodiments the PED 44 may include a second processor 80, a non-transitory computer readable media, such as a second memory 88, a second communication device 82, and a user interface device(s) 84. The second memory 88 is configured to store computer-executable instructions configured to cause the second processor 80 to present augmented power information via the user interface 84 to a user. The computer-executable instructions may be in the form of an application program configured to generate output for the user interface 84, receive user input via the user interface 84, and transmit and receive information with the control unit 24. A user using the user interface 84 may identify a usage mode for how the backup battery 30 is to be used. The identified usage mode is transmitted to the control unit 24 and stored in the memory 64.

In various embodiments the instructions stored in the memory 64 cause the processor 60 to receive a signal indicating connection of the battery 33 to the DC bus 52, determine availability of electrical power from the alternative energy source 34, and instruct charging the battery 33 with the electrical power from the alternative energy source 34 responsive to determining that the electrical power from the alternative energy source 34 is available.

In various embodiments the instructions stored in the memory 64 cause the processor 60 to supplement the charging of the battery 33 with electrical power from the AC grid energy source 25. A combination of the electrical power from the alternative energy source 34 and the AC grid energy source 25 is no more than a maximum charging rate for the battery 33.

In various embodiments the instructions stored in the memory 64 cause the processor 60 to determine availability of electrical power from the backup battery 30 and supplement charging of the battery 33 with the electrical power from the backup battery 30 responsive to the backup battery 30 being determined to be available. A combination of the electrical power from the alternative energy source 34, the AC grid energy source 25, and the backup battery 30 is no more than the maximum charging rate of the battery 33.

In various embodiments the instructions stored in the memory 64 cause the processor 60 to determine availability of electrical power from the backup battery 30 responsive to the determined available electrical power from the AC grid energy source 25 and the alternative energy source 34 being less than the maximum charging rate of the battery 33, determine a stored usage mode for the backup battery 30 responsive to determining that the electrical power from the backup battery 30 is available, and supplement the charging of the battery 33 with a first amount of the electrical power from the backup battery 30, responsive to determining the stored usage mode is a first usage mode, e.g., a self-consumption mode. The self-consumption mode of backup battery usage is a mode that gives preference to using the backup battery 30 whenever possible. A combination of the electrical power from the alternative energy source 34 and the backup battery 30 is no more than the maximum charging rate of the battery 33.

In various embodiments the instructions stored in the memory 64 cause the processor 60 to determine a grid power mode responsive to determining the stored usage mode is a second usage mode, e.g., a time-of-use mode, and supplement the charging of the battery 33 with an amount of electrical power from the backup battery 30 depending upon the determined grid power mode. The grid power mode identifies whether the grid power rate is above or below a previously-defined cost threshold amount. The time-of-use mode identifies different times of the day/week where electrical power received from the AC grid energy source 25 is charged ($/kWh) to customers at a peak usage rate (ON-peak) (a first grid power mode) or a non-peak usage rate (OFF-peak) (a second grid power mode). Additional usage rates may apply and one or more previously-defined cost threshold amounts may be used for determining opportunities for using electrical power from the backup battery 30 for reducing utility bills. The electrical power from the backup battery 30 used to supplement is at most equivalent to a difference between the maximum charging rate of the battery 33 and a combination of the electrical power from the alternative energy source 34 and AC grid energy source 25.

In various embodiments the instructions are further configured to cause the processor 60 to supplement the charging of the battery 33 with a second amount of electrical power from the backup battery 30, responsive to the usage mode being the second usage mode (time-of-use mode) and the grid power rate being less than the previously-defined cost threshold amount. The second amount is less that the first amount of electrical power. The second amount of electrical power from the backup battery 30 is at most equivalent to a difference between the maximum charging rate of the battery 33 and a combination of the electrical power from the alternative energy source 34 and the AC grid energy source 25.

In various embodiments the instructions are further configured to cause the processor 60 to supplement the charging of the battery 33 with a third amount of electrical power from the backup battery 30, responsive to the usage mode being the second usage mode (time-of-use mode) and the grid power rate being greater than the previously-defined cost threshold amount. A combination of the electrical power from the alternative energy source 34 and the third amount of electrical power from the backup battery 30 are no more than the maximum charging rate of the battery 33.

In various embodiments and given by way of example only and not of limitation, the communication devices 62 and 82 may communicate over a wire or using a high frequency pulse width modulated signals based on the standards DIN SPEC70121 and ISO/IEC 15118-series. Data communication and data communication protocols are extremely well known in the art and no further explanation is necessary for a person of skill in the art to understand disclosed subject matter.

Now that the system 20 and its components have been explained by non-limiting examples given by way of illustration only, various illustrative charging scenarios will be explained by way of non-limiting examples.

Figure 3:
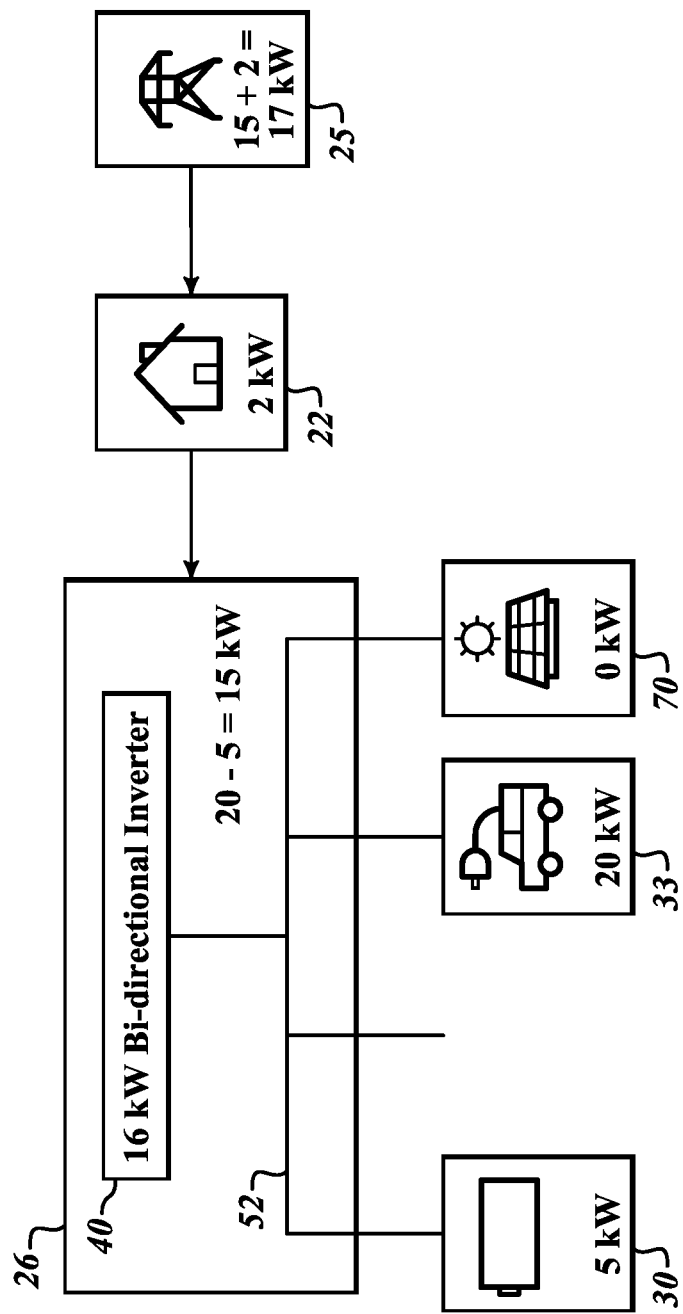
FIG. 3 is a block diagram in partial schematic form of an illustrative first operational scenario.

As shown in FIG. 3, in various embodiments an illustrative first charging scenario identifies that electrical power from a solar panel 70 is unavailable. Thus, in order to reach the maximum charging rate for charging the battery 33, the available power in the backup battery 30 is used and supplemented by electrical power from the AC grid energy source 25. In the first charging scenario the backup battery 30 sends 5 kW to the battery 33 and the AC grid energy source 25 adds an additional 15 kW. Thus, the total power drawn from the AC grid energy source 25 is 17 kW-15 kW for charging the battery 33 and 2 kW drawn by the other loads of the structure 22.

Figure 4:
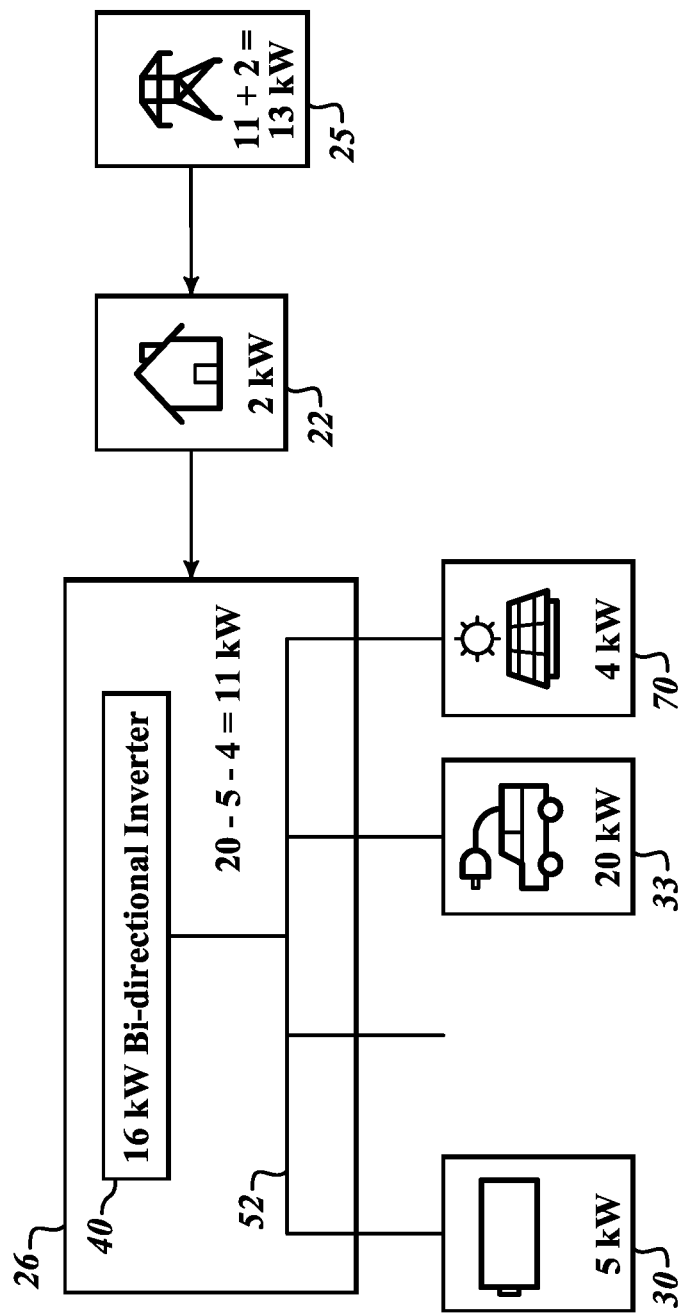
FIG. 4 is a block diagram in partial schematic form of an illustrative second operational scenario.

As shown in FIG. 4, in various embodiments an illustrative second charging scenario identifies that electrical power from the solar panel 70 is available and the combination of electrical power from the solar panel 70 and the AC grid energy source 25 may or may not meet the maximum charging rate for charging the battery 33. The backup battery usage mode is in the self-consumption mode or the time-of-use with the grid power mode in the ON-peak mode. The ON-peak mode identifies the grid power rate being greater than a previously-defined cost threshold amount. The available electrical power from the backup battery 30 (5 kW) is combined with the available electrical power (4 kW) from the solar panel 70 with the AC grid energy source 25 adding an additional 11 kW to attain the maximum charging rate of 20 kW. The total power drawn from the AC grid energy source 25 is 13 kW-11 kW for charging the battery 33 and 2 kW drawn by the other loads of the structure 22.

Figure 5:
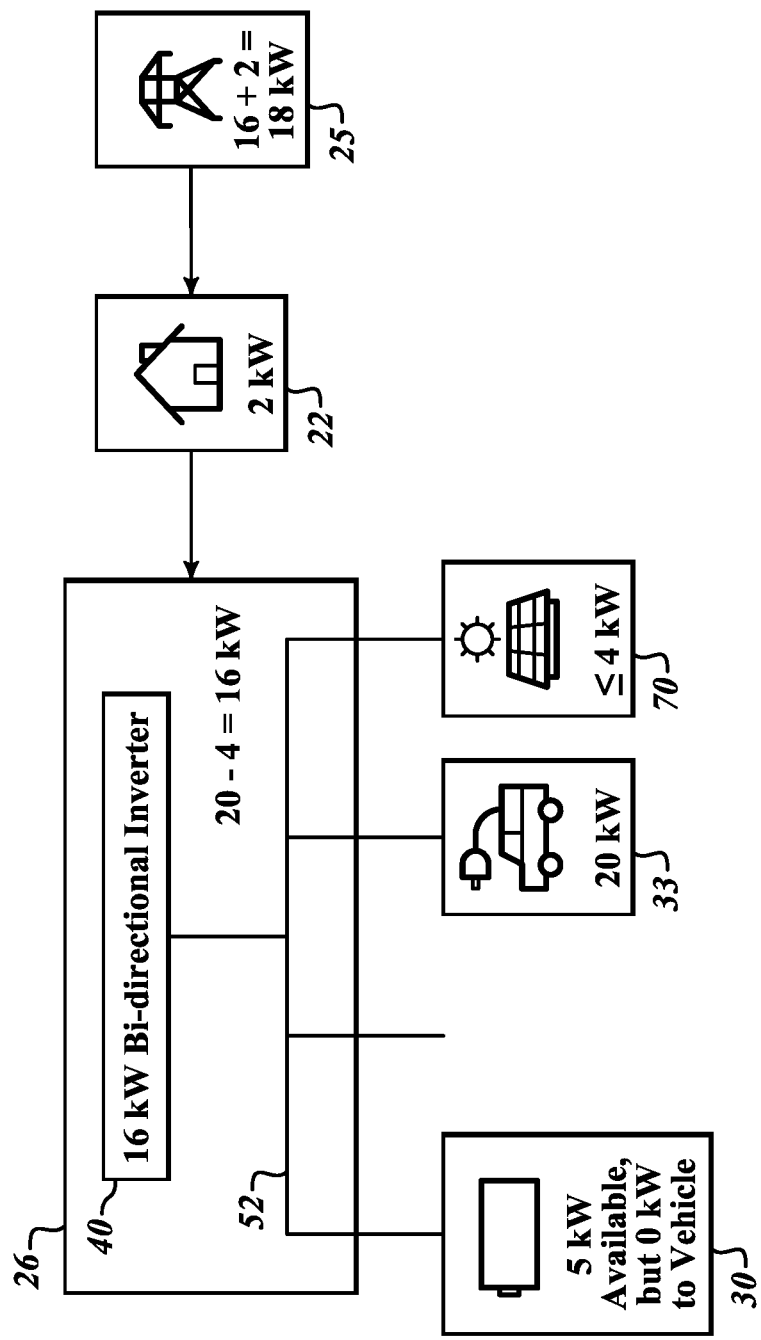
FIG. 5 is a block diagram in partial schematic form of an illustrative third operational scenario.

As shown in FIG. 5, in various embodiments an illustrative third charging scenario identifies that electrical power from the solar panel 70 is available and the combination of electrical power from the solar panel 70 and the AC grid energy source 25 may or may not meet the maximum charging rate for charging the battery 33. The backup battery usage mode is in a storm/sleep mode or the time-of-use with the grid power mode in the OFF-peak mode, thus the backup battery 30 is not used to charge the battery 33 of the vehicle 32. The OFF-peak mode identifies the grid power rate being less than a previously-defined cost threshold amount. The storm/sleep mode conserves electrical power in the backup battery 30 for use for other purposes, such as during a grid power outage. The available electrical power from the solar panel 70 of <4 kW is combined with 16 kW added by the AC grid energy source 25 to attain or nearly attain the maximum charging rate of 20 kW. The total power drawn from the AC grid energy source 25 is 18 kW-16 kW for charging the battery 33 and 2 kW drawn by the other loads of the structure 22.

Figure 6:
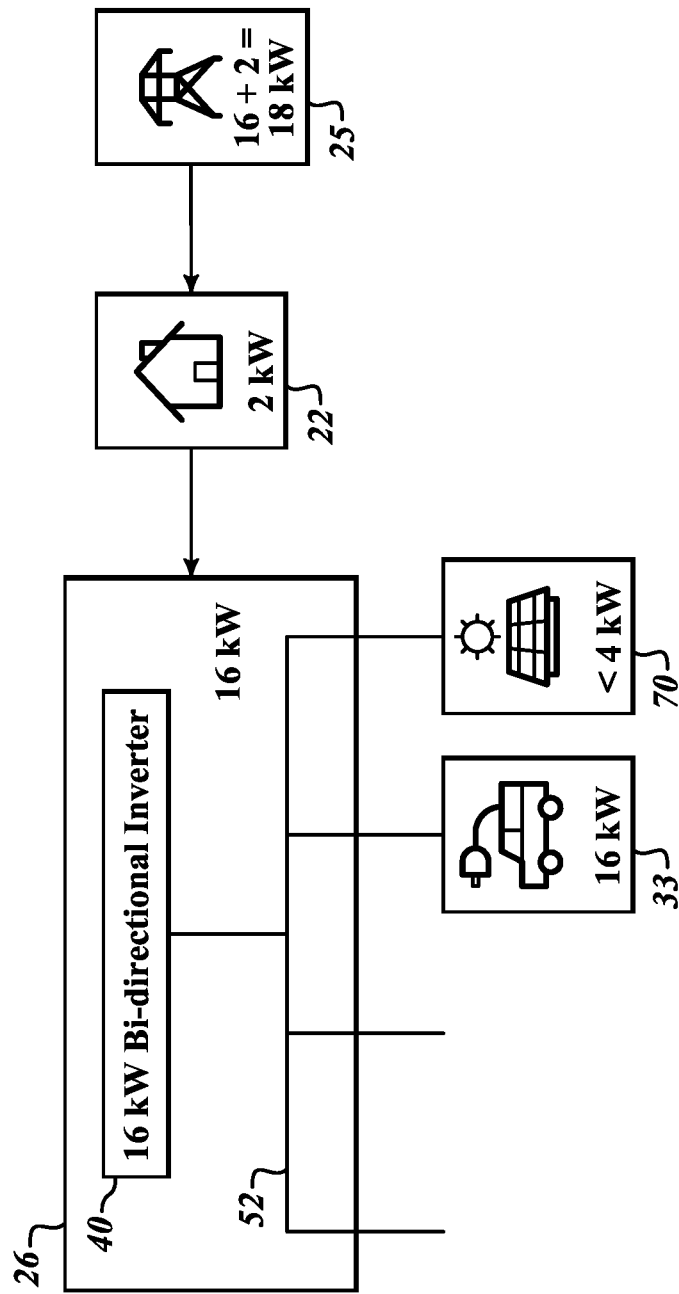
FIG. 6 is a block diagram in partial schematic form of an illustrative fourth operational scenario.

As shown in FIG. 6, in various embodiments an illustrative fourth charging scenario identifies that the backup battery 30 is unavailable and the electrical power from the solar panel 70 is unavailable or does not have enough electrical power that the combination of electrical power from the solar panel 70 and the AC grid energy source 25 meets the maximum charging rate for charging the battery 33. Thus, the combination of the electric power from the AC grid energy source 25 (16 kW) and the solar panel 70 (2 kW) or less is not quite enough to get to the maximum charging rate of 20 kW. The total power drawn from the AC grid energy source 25 is maximum 18 kW-16 kW for charging the battery 33 minus the 2 kW or less from the solar panel 70 and 2 kW drawn by the other loads of the structure 22.

Figure 7:
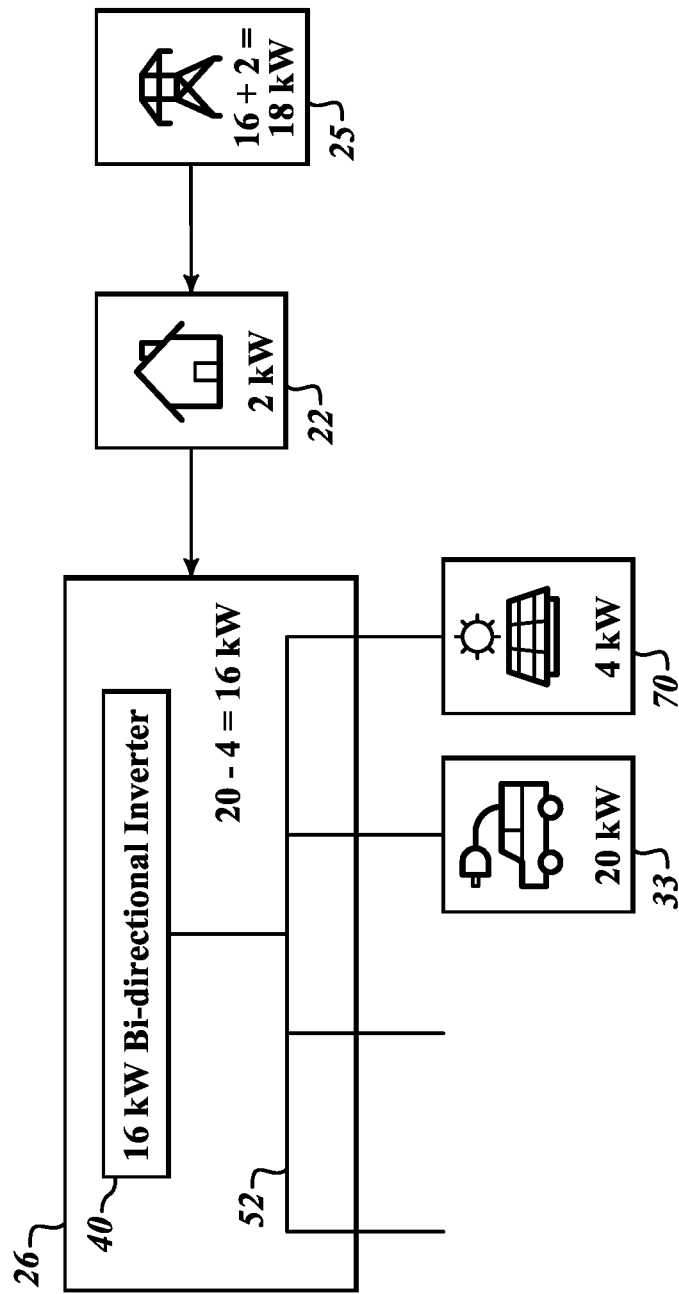
FIG. 7 is a block diagram in partial schematic form of an illustrative fifth operational scenario.

Referring to FIG. 7, in various embodiments an illustrative fifth charging scenario identifies that the backup battery 30 is unavailable and the electrical power from the solar panel 70 is available and the combination of electrical power from the solar panel 70 and the AC grid energy source 25 meets the maximum charging rate for charging the battery 33. Thus, the total power drawn from the AC grid energy source 25 is 18 kW-16 kW for charging the battery 33 and 2 kW drawn by the other loads of the structure 22.

Figure 8:
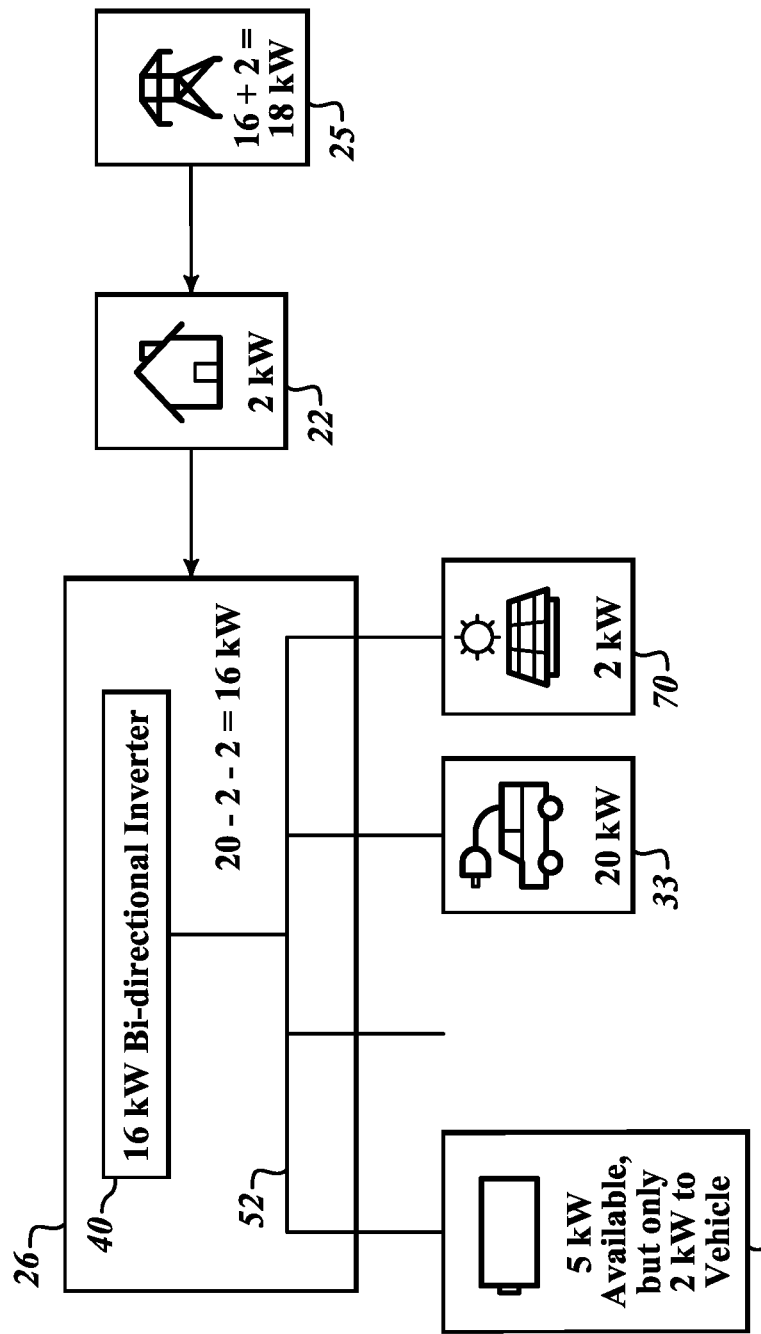
FIG. 8 is a block diagram in partial schematic form of an illustrative sixth operational scenario.

As shown in FIG. 8, in various embodiments an illustrative sixth charging scenario identifies that electrical power from the solar panel 70 is available and the combination of electrical power from the solar panel 70 (2 kW) and the AC grid energy source 25 (16 kW) is not enough to meet the maximum charging rate for charging the battery 33. The backup battery usage mode is in the time-of-use mode with the grid power mode in the OFF-peak mode. The OFF-peak mode identifies the grid power rate being less than a previously-defined cost threshold amount. The backup battery 30 is commanded to supply some electrical power but not all (2 of 5 kW), which is combined with the available electrical power (2 kW) from the solar panel 70. The AC grid energy source 25 adds an additional 16 kW to attain the maximum charging rate of 20 kW. The total power drawn from the AC grid energy source 25 is 18 kW-16 kW for charging the battery 33 and 2 kW drawn by the other loads of the structure 22.

Figure 9:
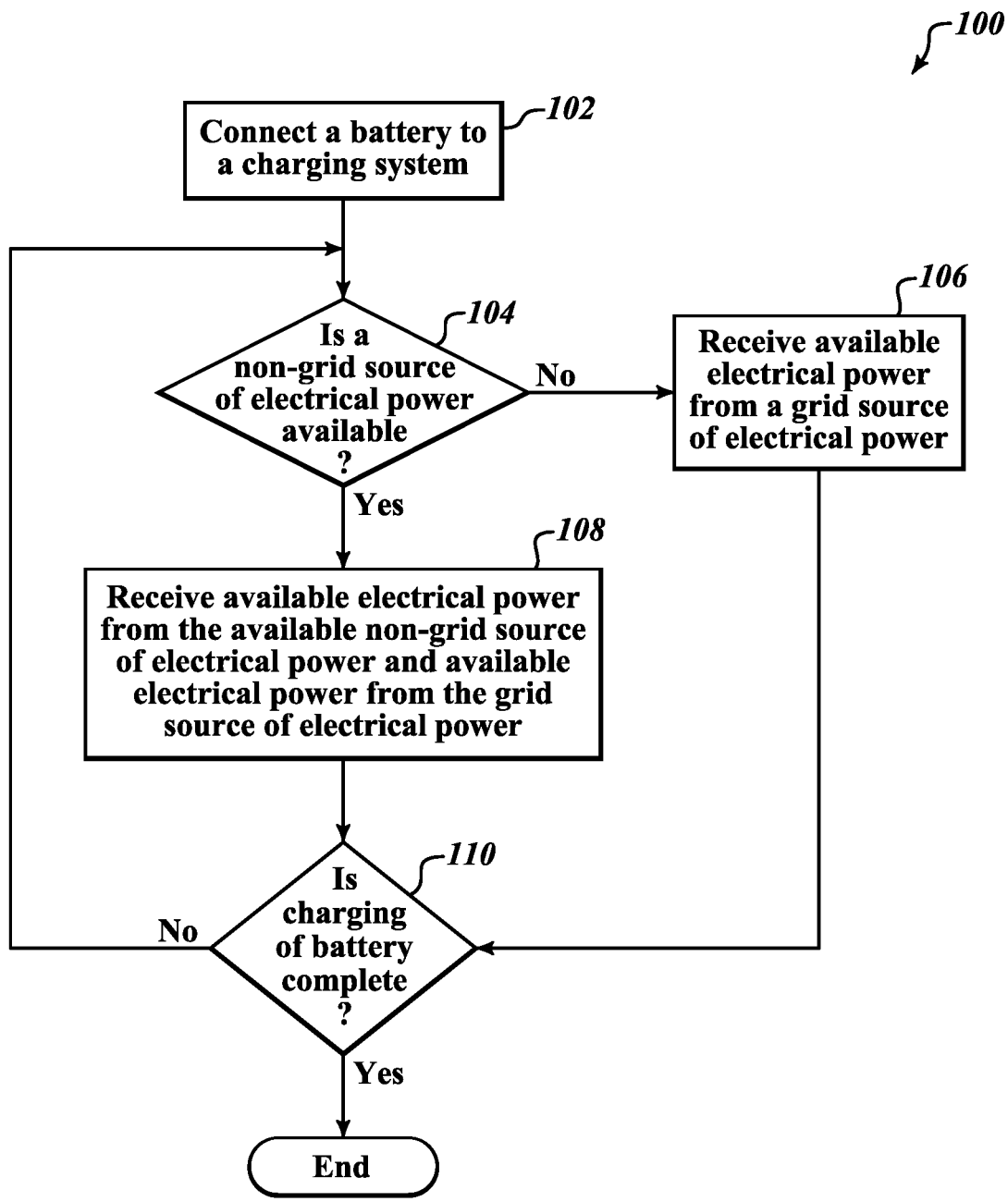
FIGS. 9 and 10A-C are flow diagrams of illustrative methods performed for boosting charging of a vehicle battery.

As shown in FIG. 9, an illustrative process 100 may be performed for supplementing charging of a battery of a vehicle coupled to an electrical system of a structure. It will be appreciated that, in some embodiments the process 100 may be suited for being performed by a control unit executing instructions stored in a memory. At a block 102, a battery is connected to a charging system. At a block 104, the charging system determines if a non-grid source of electrical power is available. At a block 106, if non-grid source electrical power is not available, the battery is charged with electrical power from a grid source. At a block 108, if the non-grid source electrical power is available, the battery is charged with a combination of electrical power from the non-grid source and the grid source. At a block 110, the process 100 continues until battery charging is complete.

Figure 10A:
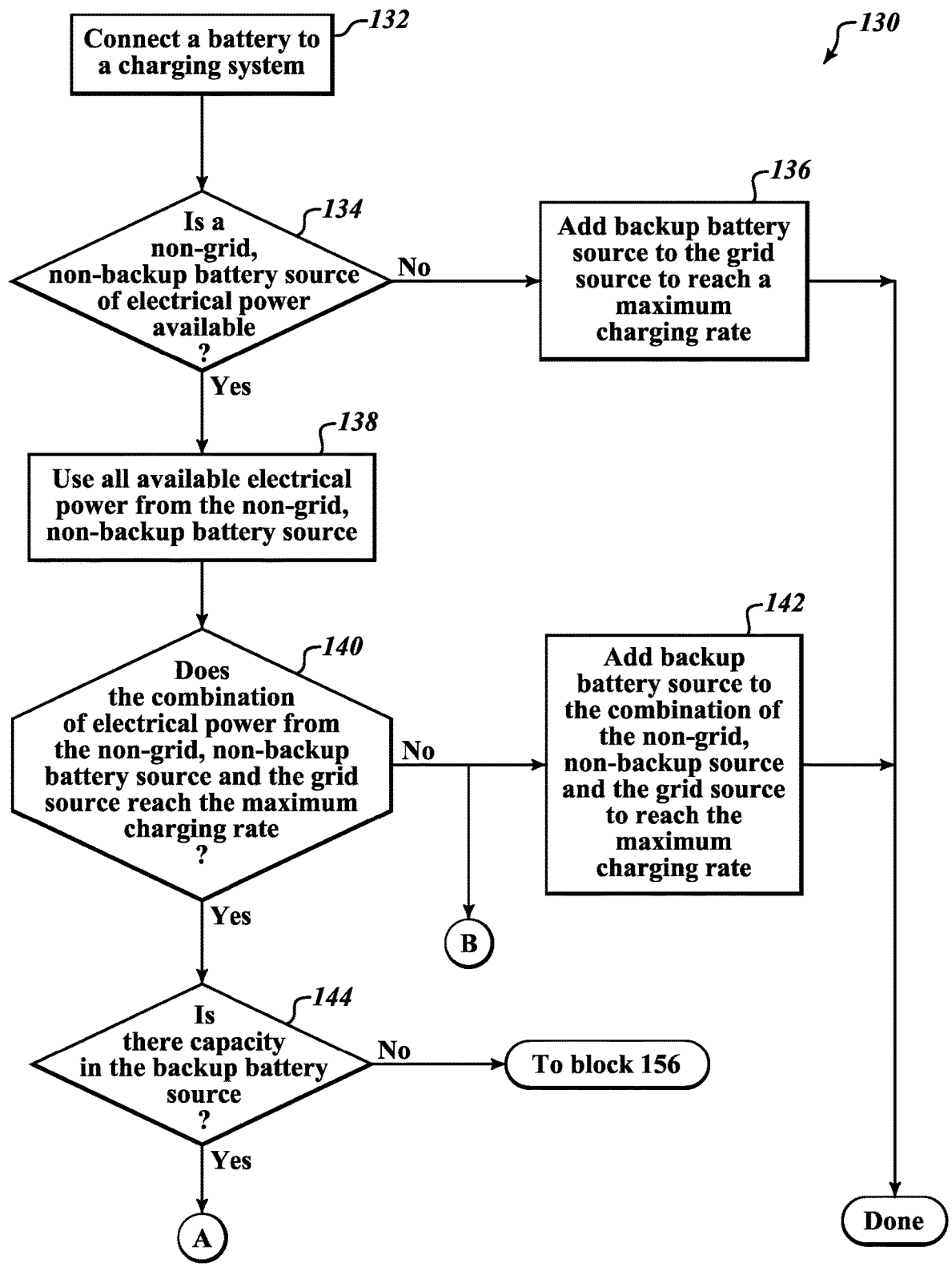
Figure 10B:
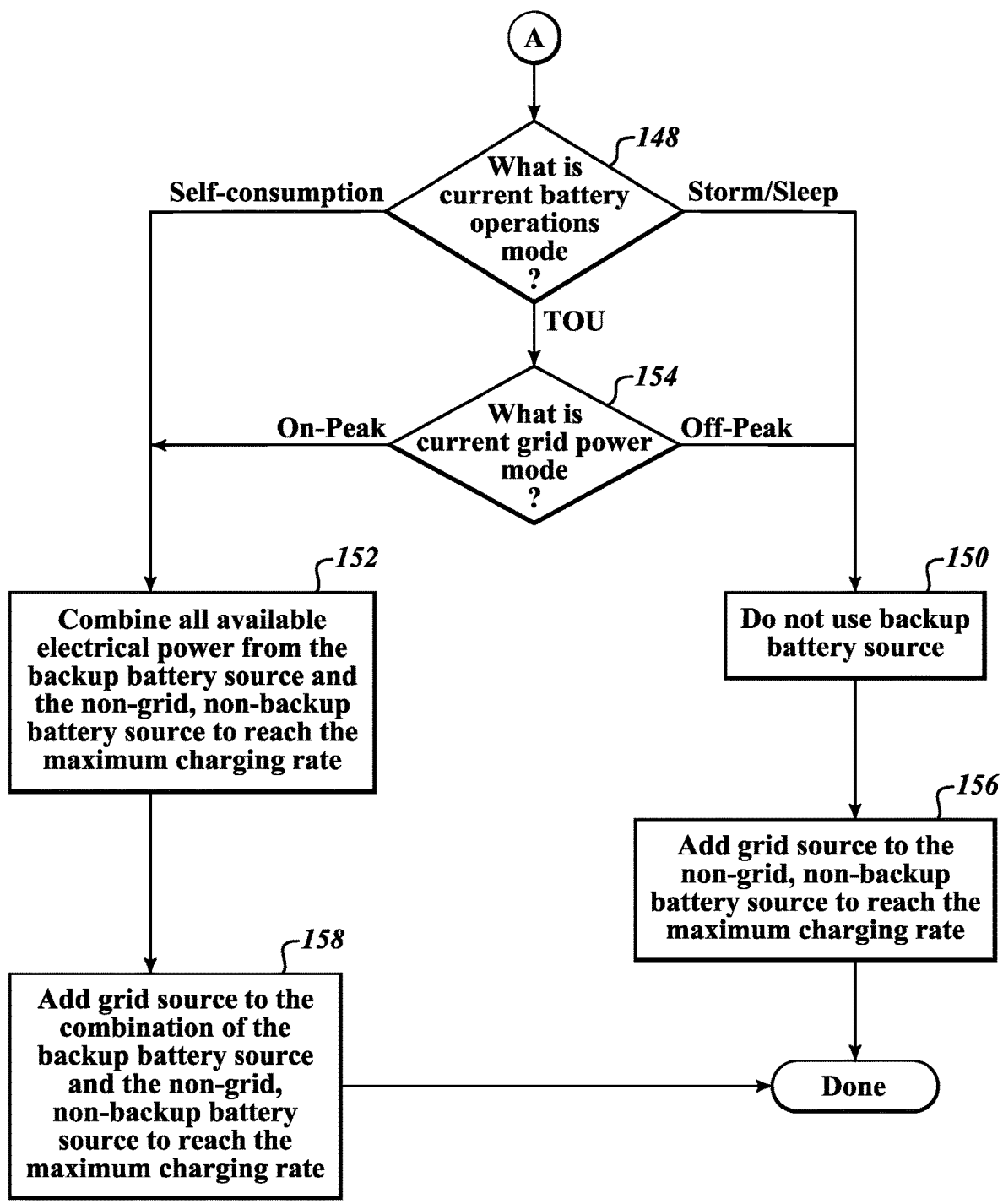

As shown in FIGS. 10A-B, an illustrative process 130 may be performed for supplementing charging of a battery of a vehicle coupled to an electrical system of a structure. It will be appreciated that, in some embodiments the process 130 may be suited for being performed by a control unit executing instructions stored in a memory. At a block 132, a battery is connected to a charging system. At a block 134, the charging system determines if a non-grid, non-backup battery source of electrical power is available. At a block 136, if the non-grid, non-backup battery source is not available, electrical power from a backup battery is added to the grid source to reach the maximum charging rate for the battery. At a block 138, if the non-grid, non-backup battery source is available, all available electrical power from the non-grid, non-backup battery source is used to charge the battery. At a block 140, the charging system determines if a combination of electrical power from the non-grid, non-backup battery source and the grid source will reach the maximum charging rate of the battery. At a block 142, if the combination of the non-grid, non-backup battery source and the grid source does not reach the maximum charging rate, the electrical power from the backup battery source is added to the combination to reach the maximum charging rate of the battery. At a block 144, if the combination of the non-grid, non-backup battery source and the grid source does reach the maximum charging rate, the charging system determines if there is capacity in the backup battery source. At a block 148, if there is capacity in the backup battery source, the charging system determines what is the current battery operations mode. At a block 150, if the current battery operations mode is the storm/sleep mode, the backup battery source is not used. At a block 156, the electrical power from the grid source is added to the non-grid, non-backup battery source to reach the maximum charging rate of the battery. The process at the block 156 is also invoked if at the block 144, the charging system determined that there is no capacity in the backup battery source. At a block 152, if the current battery operations mode is a self-consumption mode, all available electrical power from the backup battery source and the non-grid, non-backup battery source are combined to reach the maximum charging rate of the battery. At a block 158, the electrical power from the grid source is added to the combination of the backup battery source and the non-grid, non-backup battery source to reach the maximum charging rate of the battery. At a block 154, if the current battery operations mode is a time-of-use mode, the charging system determines what is the current grid power mode. If the grid power mode is the OFF-peak mode, the process goes to the block 150. If the grid power mode is the ON-peak mode, the process goes to the block 152.

Figure 10C:
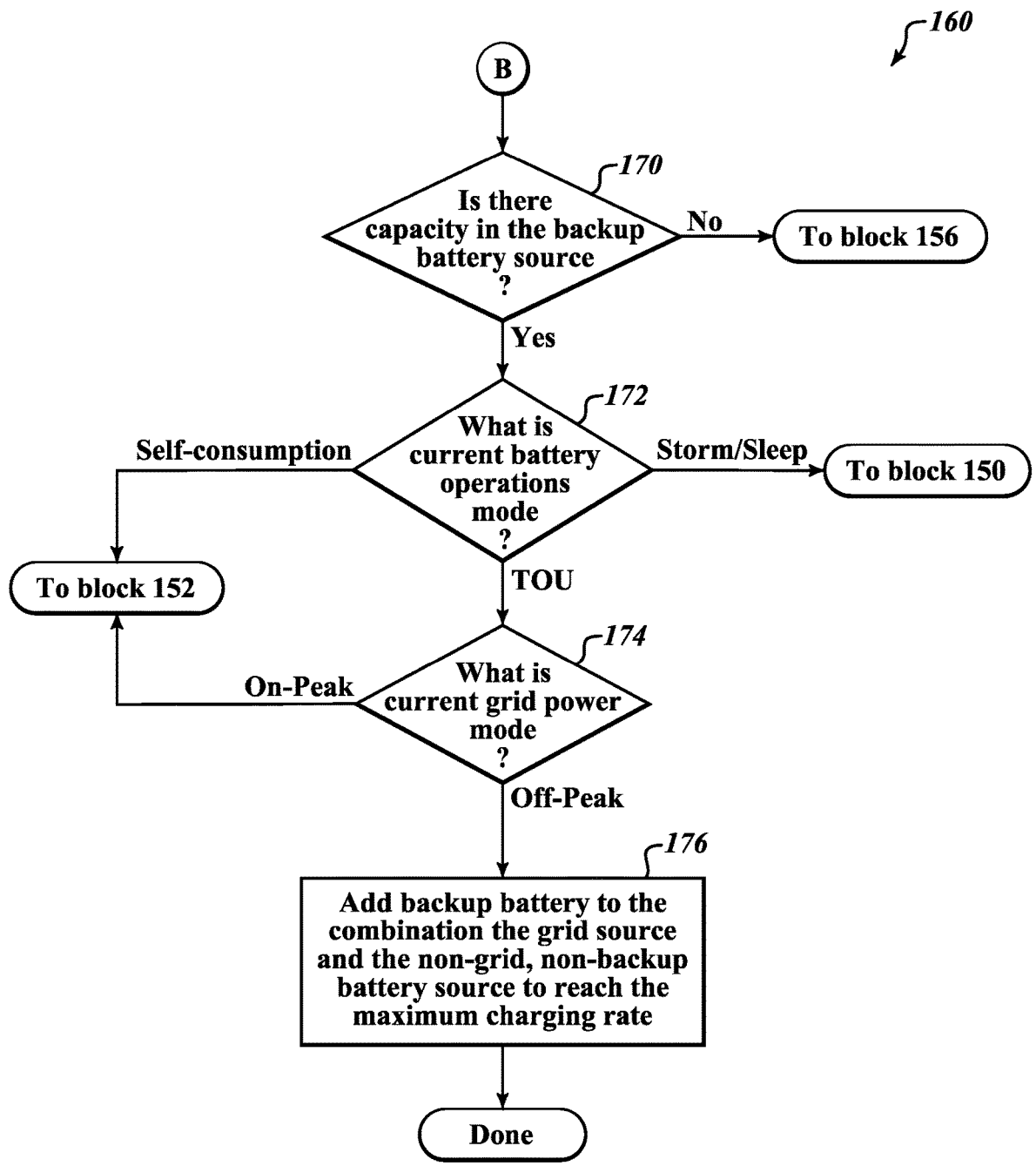

As shown in FIG. 10C, an additional process 160 extends from a portion of the process 130 of FIG. 10A. At a block 170, if the combination of the electrical power from the non-grid, non-backup battery source and the grid source do not reach the maximum charging rate as determined at the block 140 of FIG. 10A, the charging system determines if there is capacity in the backup battery source. If there is no capacity in the backup battery source the process 160 returns to the block 156 of FIG. 10B. At a block 172, if there is capacity in the backup battery source, the charging system determines what is the current battery operations mode. If the current battery operations mode is the storm/sleep mode, the process 160 continues to the block 150 of FIG. 10B. If the current battery operations mode is the self-consumption mode, the process 160 continues to the block 152 of FIG. 10B. At a block 174, if the current battery operations mode is the time-of-use mode, the charging system determines what is the current grid power mode. If the current grid power mode is the ON-peak mode, the process 160 continues to the block 152 of FIG. 10B. At a block 176, if the current grid power mode is the OFF-peak mode, electrical power from the backup battery is added to a combination of the grid source and the non-grid, non-backup battery source to reach the maximum charging rate of the battery.

Those skilled in the art will recognize that at least a portion of the control unit 24, the charging unit 36, the PED 44, controllers, processors, components, devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interactive devices (e.g., a touch pad, a touch screen, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

As discussed above, various embodiments include the non-transitory computer-readable storage medium (e.g., the memory 64 and 88) having computer-readable code (instructions) stored thereon for causing the control unit 24 or the PED 44 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the processor that, in response to such execution, causes performance of a set of operations, steps, methods, processes, algorithms, functions, techniques, etc. as described herein for the various embodiments.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A control unit comprising:
   a communication device;
   a processor configured to receive and send information via the communication device; and
   non-transitory computer-readable media configured to store usage mode information associated with a second non-grid source and computer-executable instructions configured to cause the processor to:
      receive a signal indicating connection of a battery to a direct current bus,
      determine availability of electrical power from a first non-grid source coupled to the direct current bus,
      responsive to the determined available electrical power of the first non-grid source being less than a maximum charging rate of the battery, determine availability of a first amount of electrical power from a second non-grid source coupled to the direct current bus,
      responsive to determining that the first amount of electrical power from the second non-grid source is available, determine a first usage mode associated with the second non-grid source, and
      responsive to determining the first usage mode, instruct charging the battery with a combination of the electrical power from the first non-grid source and the first amount of electrical power from the second non-grid source, wherein the combination of the electrical power is equal to or less than the maximum charging rate of the battery.

2. The control unit of claim 1, wherein:
the instructions are further configured to cause the processor to supplement the charging of the battery with electrical power from a grid source.

3. The control unit of claim 2, wherein:
the combination of the electrical power includes electrical power from the first non-grid source, the grid source, and the first amount of electrical power from the second non-grid source; and
the combination of the electrical power is no more than the maximum charging rate of the battery.

4. The control unit of claim 1, wherein:
the instructions are further configured to cause the processor to supplement the charging of the battery with a second amount of the electrical power from the second non-grid source, less than the first amount, responsive to determining a second stored usage mode associated with the second non-grid source and a grid power rate being less than a cost threshold amount; and
the second amount of the electrical power from the second non-grid source is at most equivalent to a difference between the maximum charging rate of the battery and the combination of the electrical power from the first non-grid source and the first amount of electrical power from the second non-grid source.

5. The control unit of claim 4, wherein:
the instructions are further configured to cause the processor to supplement the charging of the battery with a third amount of electrical power from the second non-grid source, greater than the second amount, responsive to determining the second stored usage mode and the grid power rate being greater than the cost threshold amount;
the combination of the electrical power includes the electrical power from the first non-grid source and the first, second, and third amounts of electrical power from the second non-grid source; and
the combination of the electrical power is no more than the maximum charging rate of the battery.

6. A system comprising:
an alternating current-direct current (AC-DC) inverter;
a DC bus couplable to the AC-DC inverter; and
a control unit including:
a communication device,
a processor configured to receive and send information via the communication device, and
non-transitory computer-readable media configured to store usage mode information associated with a second non-grid source and computer-executable instructions configured to cause the processor to:
receive a signal indicating connection of a battery to the DC bus;
determine availability of electrical power from a first non-grid source coupled to the DC bus,
responsive to the determined available electrical power of the first non-grid source being less than a maximum charging rate of the battery, determine availability of a first amount of electrical power from a second non-grid source coupled to the DC bus,
responsive to determining that the first amount of electrical power from the second non-grid source is available, determine a first usage mode associated with the second non-grid source, and
responsive to determining the first usage mode, instruct charging the battery with a combination of the electrical power from the first non-grid source and the first amount of electrical power from the second non-grid source, wherein the combination of the electrical power is equal to or less than the maximum charging rate of the battery.

7. The system of claim 6, wherein:
the instructions are further configured to cause the processor to supplement the charging of the battery with electrical power from a grid source.

8. The system of claim 7, wherein:
the combination of the electrical power includes the electrical power from the first non-grid source, the grid source, and the first amount of electrical power from the second non-grid source; and
the combination of the electrical power is no more than the maximum charging rate of the battery.

9. The system of claim 6, wherein:
the instructions are further configured to cause the processor to supplement the charging of the battery with a second amount of the electrical power from the second non-grid source, less than the first amount, responsive to determining a second stored usage mode associated with the second non-grid source and a grid power rate being less than a cost threshold amount; and
the second amount of the electrical power from the second non-grid source is at most equivalent to a difference between the maximum charging rate of the battery and the combination of the electrical power from the first non-grid source and the first amount of electrical power from the second non-grid source.

10. The system of claim 9, wherein:
the instructions are further configured to cause the processor to supplement the charging of the battery with a third amount of electrical power from the second non-grid source, greater than the second amount, responsive to determining the second stored usage mode and the grid power rate being greater than the cost threshold amount;
the combination of the electrical power includes the electrical power from the first non-grid source and the first, second, and third amounts of electrical power from the second non-grid source; and
the combination is no more than the maximum charging rate of the battery.

11. The system of claim 6, wherein the first non-grid source includes an alternative energy source.

12. The system of claim 11, wherein the alternative energy source is an energy source chosen from a solar panel, a wind turbine, and a hydroelectric source.

13. A method comprising:
connecting a battery to a direct current bus of a charging system;
determining availability of electrical power from a first non-grid source coupled to the direct current bus;
responsive to the determined available electrical power of the first non-grid source being less than a maximum charging rate of the battery, determining availability of a first amount of electrical power from a second non-grid source coupled to the direct current bus;
responsive to determining that the first amount of electrical power from the second non-grid source is available, determining a first usage mode associated with the second non-grid source; and responsive to determining the first usage mode, charging the battery with a combination of the electrical power from the first non-grid source and the first amount of electrical power from the second non-grid source, wherein the combination of the electrical power is equal to or less than the maximum charging rate of the battery.

14. The method of claim 13, further comprising supplementing the charging of the battery with electrical power from a grid source.

15. The method of claim 14, wherein:
the combination of the electrical power includes the first non-grid source, the grid source, and the first amount of electrical power from the second non-grid source; and
the combination of the electrical power is no more than the maximum charging rate for the battery.

16. The method of claim 13, further comprising:
supplementing the charging of the battery with a second amount of the electrical power from the second non-grid source, less than the first amount, responsive to determining a second usage mode associated with the second non-grid source and a grid power rate being less than a cost threshold amount,
wherein the second amount of the electrical power from the second non-grid source used to supplement the charging of the battery is at most equivalent to a difference between the maximum charging rate of the battery and the combination of the electrical power from the first non-grid source and the first amount of electrical power from the second non-grid source.

17. The method of claim 16, further comprising:
supplementing the charging of the battery with a third amount of electrical power from the second non-grid source, greater than the second amount, responsive to determining the second usage mode and the grid power rate being greater than the cost threshold amount,
wherein the combination of the electrical power includes the electrical power from the first non-grid source and the first, second and third amounts of electrical power from the second non-grid source, and
wherein the combination is no more than the maximum charging rate of the battery.

* * * * *